United States Patent [19]

Le Roy et al.

[11] Patent Number: 4,867,519

[45] Date of Patent: Sep. 19, 1989

[54] N BY N TYPE OPTICAL DIFFUSER AND COUPLING NETWORK

[75] Inventors: Guy Le Roy, Kervegan-Servel; Muguette Fraise, Verrieres le Buisson, both of France

[73] Assignee: Societe Anonyme dite: Alcatel Cit, Paris, France

[21] Appl. No.: 288,165

[22] Filed: Dec. 22, 1988

[30] Foreign Application Priority Data

Jan. 8, 1988 [FR] France .................. 88 00134

[51] Int. Cl.$^4$ ........................... G02B 6/26; G02F 1/00
[52] U.S. Cl. ............... 350/96.15; 350/96.16; 455/600; 455/612; 455/617
[58] Field of Search ............... 350/96.10, 96.15, 96.16, 350/96.20; 455/600, 612, 617; 370/1, 3

[56] References Cited

U.S. PATENT DOCUMENTS

| | | | |
|---|---|---|---|
| 4,473,271 | 9/1984 | Mitchell | 350/96.15 |
| 4,543,666 | 9/1985 | Witte et al. | 455/612 |
| 4,593,968 | 6/1986 | Giallorenzi | 350/96.15 |
| 4,708,424 | 11/1987 | Marhic | 350/96.16 |
| 4,760,580 | 7/1988 | Thompson et al. | 350/96.15 X |
| 4,775,210 | 10/1988 | Fioretti | 350/96.16 |
| 4,787,693 | 11/1988 | Kogelnik et al. | 350/96.16 |
| 4,818,051 | 4/1989 | Fraser | 350/96.16 |

FOREIGN PATENT DOCUMENTS

| | | | |
|---|---|---|---|
| 0082430 | 6/1983 | European Pat. Off. | 350/96.15 X |
| 0171479 | 2/1986 | European Pat. Off. | 350/96.15 X |
| 0241171 | 10/1987 | European Pat. Off. | 350/96.16 X |
| 0287925 | 10/1988 | European Pat. Off. | 350/96.16 X |
| 3423221 | 11/1984 | Fed. Rep. of Germany | 350/96.15 X |
| 2586874 | 3/1987 | France | 350/96.16 X |
| 2593654 | 7/1987 | France | 350/96.16 X |
| 63-66515 | 3/1988 | Japan | 350/96.16 X |

OTHER PUBLICATIONS

Drake, "Low Reflectance Terminations and Connections . . . ", Appl. Optics, vol. 20, No. 9, 5/81, pp. 1640–1644.
Marhic, "Hierarchic and Combinatorial Star Couplers", Optics Lett., vol. 9, No. 8, 8/84, pp. 368–370.
Electronics Letters, vol. 21, No. 11, May 1985, pp. 482–484, Stevenage, Herts, GB; Y. Kokubun, et al., "Mesh Wavguide Optical Star Coupler".
International Switching Symposium 1987, "Innovations in Switching Technology", 15–20 Mar. 1987, pp. 0999–1003, IEEE, Shimoe, et al., A Path-Independent-Inseertion-Loss Optical Space Switching Network.
International Switching Symposium 1987, "Innovations in Switching Technology", 15–20 Mar. 1987, pp. 0994–0998, IEEE; Walter, Optical Switching, Using Different Switching Principles.
Electronics Letters, vol. 21, No. 11, May 23, 1985, pp. 502–504, Stevenage, Herts, GB; Mortimore, "Low-Loss 8×8 Single-Mode Star Coupler".

Primary Examiner—William L. Sikes
Assistant Examiner—Brian M. Healy
Attorney, Agent, or Firm—Sughrue, Mion, Zinn, Macpeak & Seas

[57] ABSTRACT

The diffuser is made from $N=2^n$ light ducts divided into two sets of $\frac{1}{2}N$ ducts, with every other duct belonging to a different one of the sets. The two sets of ducts are helically wound in opposite directions but at the same helical pitch over a cylinder (1). Each duct in either set crosses over the $\frac{1}{2}N$ ducts in the other set, and couplers are provided at those cross-overs between any given duct and the $\frac{1}{2}N$ ducts of the other set having cross-over numbers $2^q$, where $q=0, 1, 2, \ldots, (n-1)$. The diffuser has stages each comprising $\frac{1}{2}N$ couplers, with each stage being disposed in a ring around the cylinder.

5 Claims, 6 Drawing Sheets

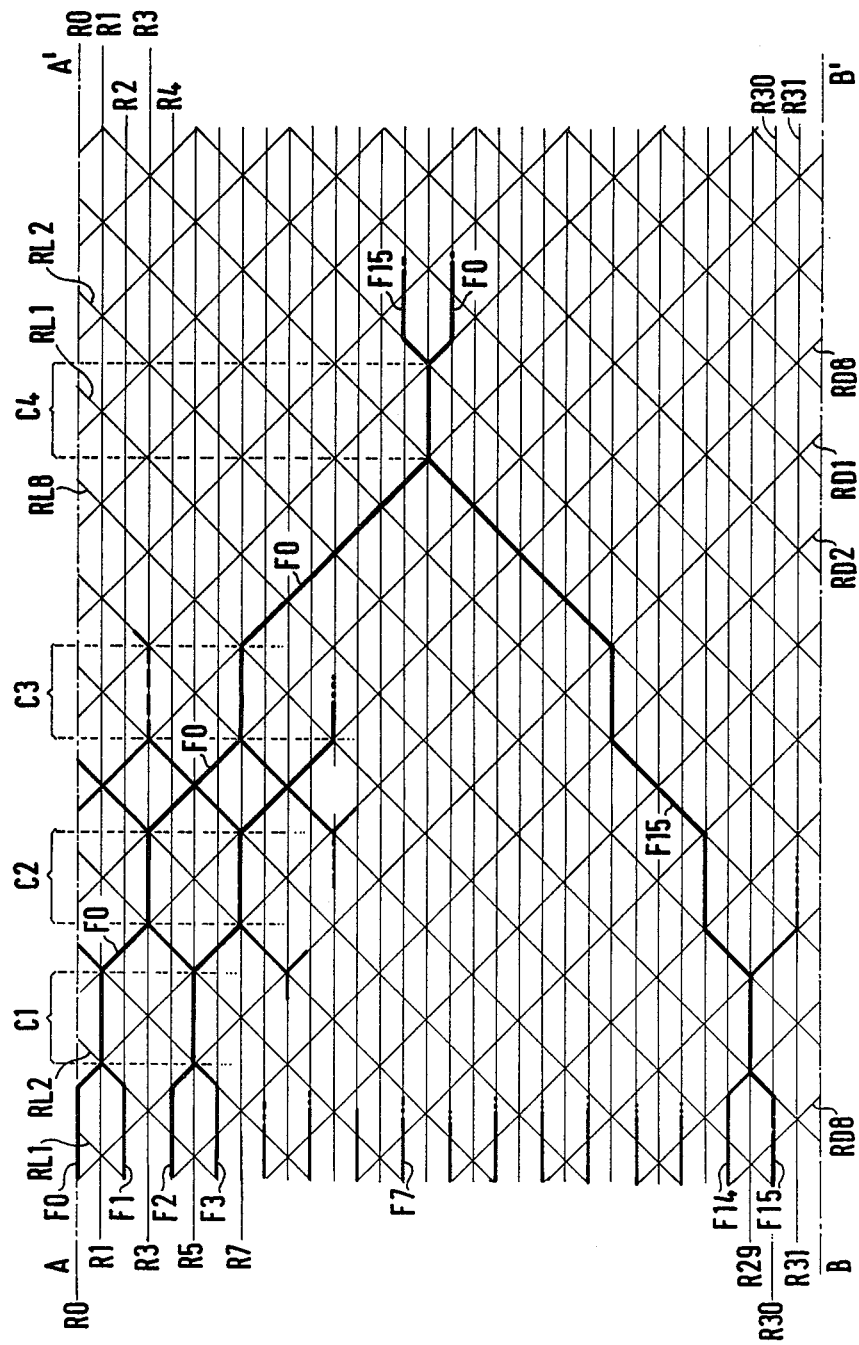

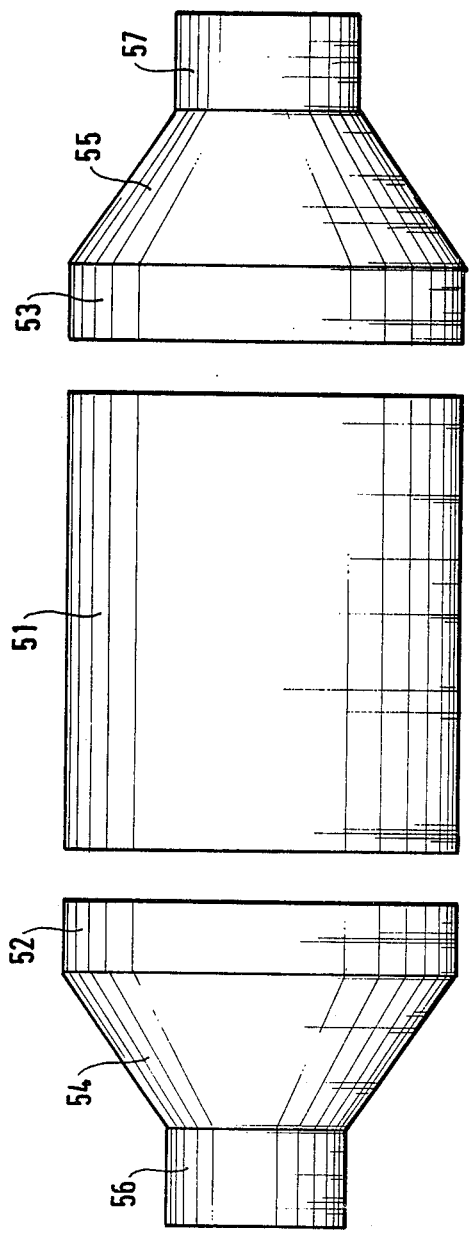

N BY N TYPE OPTICAL DIFFUSER AND COUPLING NETWORK

The invention relates to N by N type optical diffusers in which the optical signals coming from N inlet fibers are conveyed to N outlet fibers in such a manner that each of the outlet fibers includes all N optical signals from the N inlet fibers.

BACKGROUND OF THE INVENTION

Optical diffusers are constituted by an assembly of 2 by 2 couplers, i.e. couplers having two inlets and two outlets, with such couplers being of any conventional type known to the person skilled in the art.

The principle of assembling couplers 2 by 2 in multiple stage networks in order to realize high capacity diffusers is, itself, known: the article by M. E. Marhic entitled "Hierarchic and combinatorial star couplers" published in Optics Letters, Vol. 9, No. 8, August 1984, pages 368 to 370 describes one possible assembly of elementary (2 by 2) couplers in a welded mesh, however a diffuser constituted in this way suffers from high loss due to the accumulation of the loss due to the successive mesh connections. One way of reducing this loss between the inlet and the outlet of the diffuser consists in reducing the number of interconnections by directly combining $2^n$ lengths of fiber in order to constitute the couplers of a diffuser. However, the author describes neither a practical organization nor a method of making such diffusers. The article by D. B. Mortimore entitled "Low-loss $8\times 8$ single-mode star coupler" published in Electronics Letters, May 1985, Vol. 21, No. 11, pages 502 to 504 describes an 8 by 8 star type coupler constituted by three rows of four couplers.

N by N diffusers have a plane structure and are realized by interconnecting two $\frac{1}{2}N$ by $\frac{1}{2}N$ diffusers by means of couplers; for example an 8 by 8 diffuser is realized by interconnecting two 4 by 4 diffusers via four couplers.

Prior art diffusers made using lengths of fiber and occupying a plane structure suffer from several drawbacks:

the fiber outlets are not ordered, i.e. they do not succeed one another in the same order at the outlet as at the inlet;

fiber lengths differ from one length to another and consequently signal propagation times and losses are not identical; and the various paths are different and complex such that for a large number of fibers it is not possible to fabricate a diffuser automatically in simple manner.

The object of the invention is to provide an N by N diffuser based on $N=2^n$ light ducts and in which the light ducts all have the same length between the inlet and the outlet of the diffuser.

Another object of the invention is to provide an N by N diffuser in which the light ducts follow identical paths.

Another object of the invention is to provide an N by N diffuser in which the order in which the light ducts succeed one another at the outlet of the diffuser is the same as the order in which they succeed one another at its inlet.

Another object of the invention is to provide and N by N diffuser capable of being manufactured automatically by a machine derived from a conventional cable-making machine.

SUMMARY OF THE INVENTION

The present invention provides an N by N type optical diffuser where $N=2^n$, having n stages each comprising $\frac{1}{2}N$ couplers each providing coupling between two light ducts, said diffuser being made from N light ducts whose ends constitute the inlets and the outlets of the diffuser, wherein the light ducts constitute two sets of $\frac{1}{2}N$ light ducts each, with each set being constituted by every other light duct, said sets being wound helically on a cylinder in opposite directions and at the same pitch, with each light duct of either assembly crossing over the $\frac{1}{2}N$ light ducts of the other assembly, and with each light duct of either assembly being coupled to n of the light ducts of the other assembly at those cross-overs of said light duct with the $\frac{1}{2}N$ light ducts of said other assembly having cross-over numbers $2^q$, where $q=0, 1, 2, \ldots, (n-1)$.

BRIEF DESCRIPTION OF THE DRAWINGS

Embodiments of the invention are described by way of example with reference to the accompanying drawings, in which:

FIGS. 5 and 6 show developed surfaces respectively of a cylindrical mandrel and of a diffuser made using said mandrel, for a 16 by 16 diffuser; and FIG. 7 shows an embodiment of a system for connecting a diffuser to two cable heads.

MORE DETAILED DESCRIPTION

Figure 1:
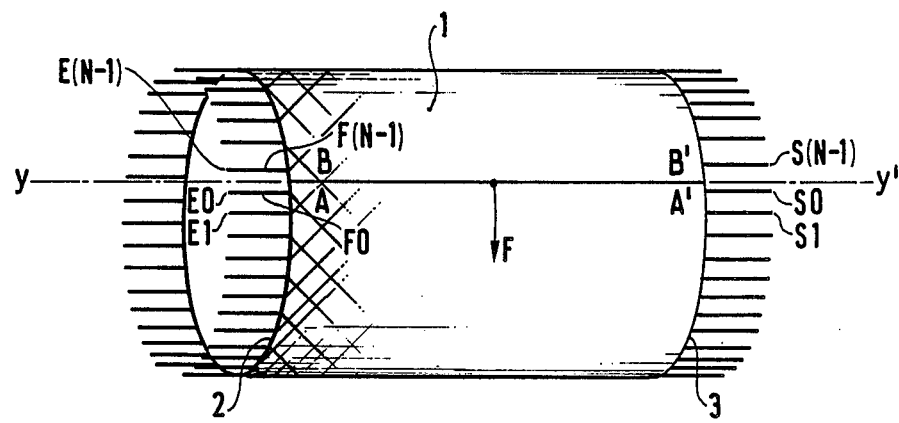
FIG. 1 is a symbolic representation of an N by N optical diffuser of the invention.

FIG. 1 is a symbolic representation of an N by N diffuser with $N=2^n$, the diffuser being in the form of a cylinder 1 having optical fibers wound thereabout with the inlets and the outlets of the fibers being uniformly distributed around two base circles 2 and 3 of the cylinder.

Figure 2:
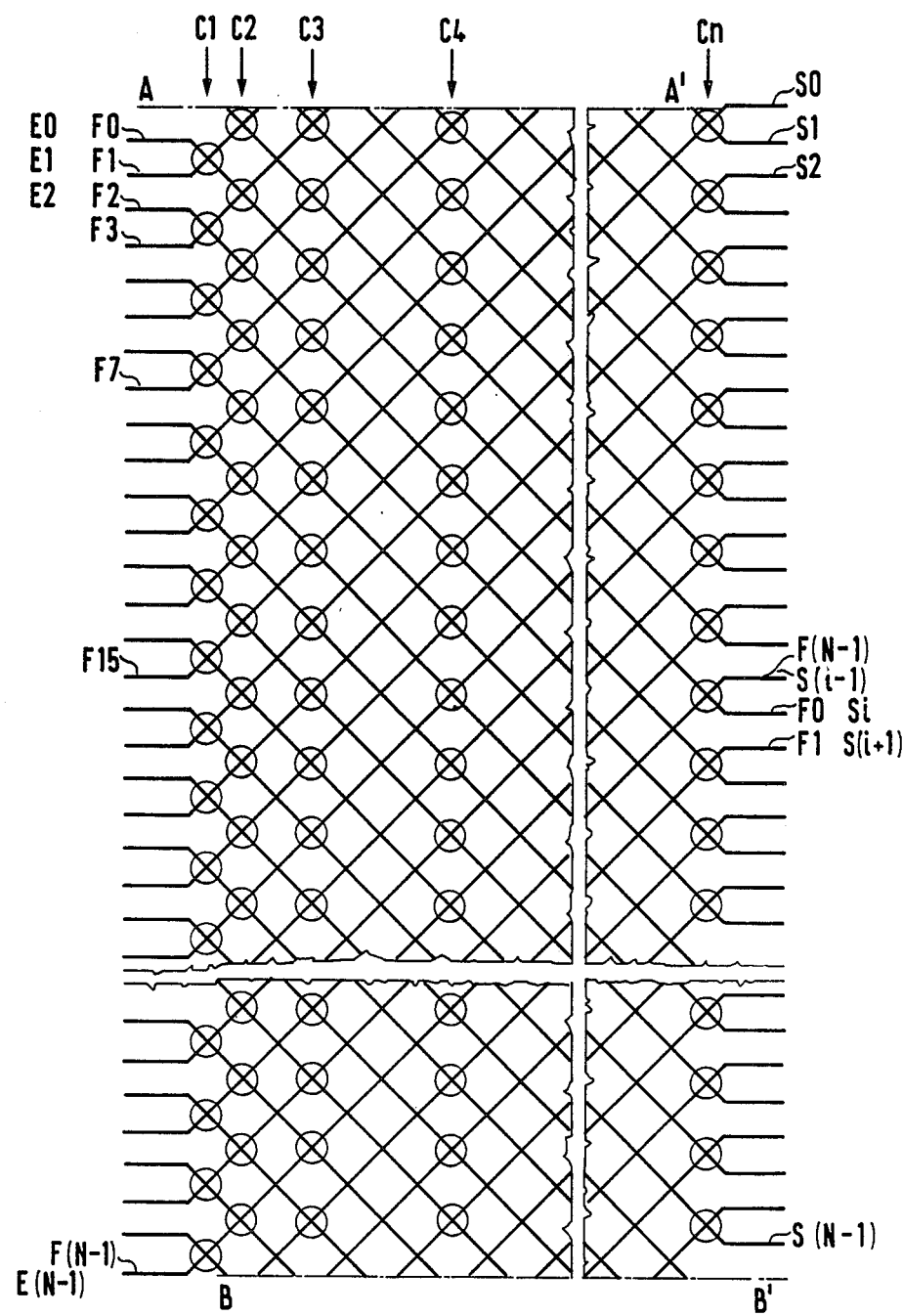
FIG. 2 shows the FIG. 1 diffuser as a developed surface, thereby demonstrating the theory of coupler and fiber winding.

FIG. 2 represents a development of the FIG. 1 cylinder 1, starting from line YY' and going in the direction of an arrow F, with the beginning of the developed surface being referenced AA' and the end of the developed surface being referenced BB'. FIG. 2 shows how the fibers are wound round the cylinder.

For winding purposes, the optical fibers are split into two sets of fibers each containing every other fiber, i.e. each containing a $\frac{1}{2}N$ fibers, with both sets of fibers being wound helically around the cylinder, but in opposite directions, with the winding pitch being the same in both cases. The two sets of fibers thus form a lattice with a losange-shaped mesh.

The inlets E0 to E(N−1) of the diffuser are constituted by the ends of optical fibers F0 to F(N−1), with the fibers being wound starting from a fiber that is wound with a righthand helix and with the numbering continuing in the righthand direction. Each fiber F2p, where $p=0, 1, 2, \ldots (\frac{1}{2}N-1)$, is associated in succession with the fibers $F\{(2p+2^m-1) \bmod N\}$, for $m=1, 2, 3, \ldots, n$, wound in a lefthand helix in order to constitute elementary (2 by 2) couplers. The diffuser comprises n stages C1 to Cn, with each stage comprising $\frac{1}{2}N$ couplers, such that m constitutes a stage number. The fiber F2p=F0 for p=0 is thus associated: in stage C1, (m=1), with the fiber F1; in stage C2, (m=2), with the fiber F3; in stage C3, (m=3), with the fiber F7; in stage C4, (m=4), with the fiber F15; and in stage Cn, (m=n), with the fiber F(N−1). The outlets S0 to S(N−1) are constituted by the opposite ends of the fibers F0 to F(N−1). The fibers are in the same order at the outlet as they are at the inlet, however the outlets are offset relative to the inlets with outlet Si corresponding to the fiber F0, with outlet S(i+1) corresponding to the fiber F1, and so on, with the outlet S(i−1) corresponding to the fiber F(N−1).

Figure 3:
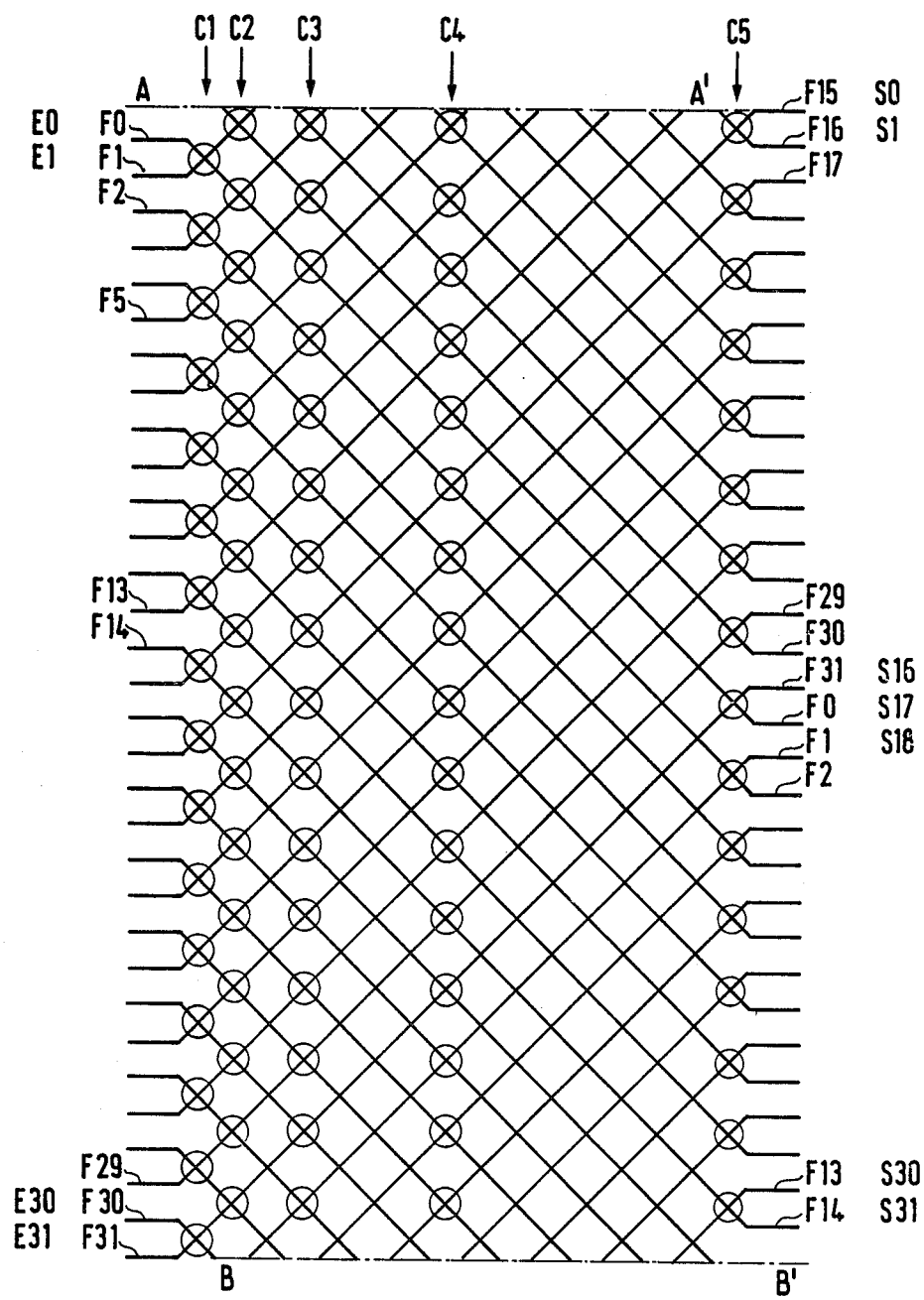
FIG. 3 shows the developed surface of a diffuser of the invention for the case where $N=32$.

FIG. 3 is a developed surface of the FIG. 1 cylinder for the case where the diffuser has $N=32=2^5$ fibers. This diffuser thus has n=5 stages C1 to C5 each comprising $\frac{1}{2}N=16$ couplers. In FIG. 3, outlets S17 to S31 correspond to fibers F0 to F14 respectively, while outlets S0 to S16 correspond to fibers F15 to F31, respectively. As mentioned above, a fiber F2p is associated in succession with fibers $F[(2p+2^m-1) \mod 32]$, for m=1, 2, 3, 4, and 5. For example, the fiber F30, for which $p=\frac{1}{2}N-1=16-1=15$, is associated in succession: in stage C1, (m=1), with the fiber F(30+1)=F31; in stage C2, (m=2), with the fiber F[(30+4−1) mod 32]=F1; in stage C3, (m=3), with the fiber F[(30+8−1) mod 32]=F5; in stage C4, (m=4), with the fiber F[(30+16−1) mod 32]=F13; and in stage C5, (m=5), with the fiber F[(30+32−1) mod 32]=F29.

In FIGS. 2 and 3, the fibers have been numbered starting from a fiber which is wound with a righthand helix, thereby making it possible to determine all of the couplers that need to be realized in the diffuser.

Since the diffuser is constituted by two sets of fibers wound in mutually opposite directions, it is entirely symmetrical such that the N fibers could be numbered from a fiber wound with a lefthand helix, with the fibers being numbered in the same direction as that helix, i.e. in the opposite direction to the examples shown in FIGS. 2 and 3. The above formulas for determining which fibers are associated for constituting couplers are equally applicable to fibers wound in a lefthand helix, and the same couplers as above are naturally required.

As a result, in order to known which fibers are associated by means of couplers to a given fiber, the N fibers are numbered from F0 to F(N−1) in the same direction as the winding direction of said fiber taken as the origin and designated by F0. Fibers which are associated by couplers are numbered $2^m-1$, with m=1, 2, ..., n, and $N=2^n$. This corresponds to the formula given above $F[(2p+2^m-1) \mod 32]$ which gives the numbers of the fibers associated with the fiber F2p. By putting p=0 the numbers are obtained of the fibers which are associated with the fiber F0, i.e. the fiber taken as the numbering origin, which fibers are: $F(2^1-1)=F1$; $F(2^2-1)=F3$; $F(2^3-1)=F7$; ...; $F(2^n-1)=F(N-1)$.

Each fiber in one of the sets of fibers is thus coupled successively with n of the fibers of the other set of fibers since m=1, 2, ..., n, and m is referred to as the stage number, since for a given value of m, all of the corresponding couplers are situated on the same ring around the cylinder, and there are $\frac{1}{2}N$ couplers per stage since each set of fibers has $\frac{1}{2}N$ fibers. Each fiber in either set crosses over all of the $\frac{1}{2}N$ fibers of the other set, and couplers are situated at cross-overs of order $2^q$ with q=0, 1, 2, ..., (n−1), between a given fiber and the $\frac{1}{2}N$ fibers of the other set of fibers, i.e. fibers in the other set of fibers numbered 1, 2, 4, ..., $\frac{1}{2}N$. The couplers corresponding to these cross-overs are situated successively at stages C1, C2, ..., Cn. A fiber F0 taken as the origin is associated by means of a coupler with the fibers $F(2^m-1)$, and since m=1, 2, ..., n, there are n couplers with fibers numbered F1, F3, F7, F(N−1), with the cross-overs between the fibers F0 and said fibers F1, F3, F7, ..., F(N−1), being the first, second, fourth, ..., $2^{(n-1)}$-th cross-overs between the fiber F0 and the $\frac{1}{2}N$ fibers of the other set of fibers. For a given value of q, the $\frac{1}{2}N$ corresponding couplers constitute one stage of the diffuser, and since the two sets of fibers are wound in opposite directions with the same helical pitch, all of the couplers of a stage are situated on a ring around the cylinder. Cross-overs of number $2^q$ constitute a stage of number m, where the parameters q and m are related by the equation q=m−1.

Since the two sets of fibers are wound in opposite directions at the same helical pitch, and since the couplers of the last stage Cn are constituted by pairs of fibers F0 and F(N−1) whose inlets are contiguous and which are crossing each other for the first time, the outlets of said fibers are offset relative to their inlets by one-half of the winding pitch. In FIG. 3, the outlets of fibers F0 and F31 are offset relative to the inlets E0 and E31 by one-half of the winding pitch. The same is true of all of the fibers, so that the fibers appear at the outlet successively in the same order as they appear at the inlet, but with an offset of one-half of the helical pitch.

The couplers are therefore placed on rings distributed along the cylinder at positions which are identifiable as a function of the helical winding pitch of the fibers and of the lengths of the couplers. The couplers are regularly distributed around their rings at an angular pitch $\alpha = 4\pi/N$. The couplers of stages 2 to n, referenced C2 to Cn, are situated on $\frac{1}{2}N$ generator lines of the cylinder spaced apart at an angular pitch of $\alpha$. The couplers of the first stage C1 are angularly situated between pairs of successive couplers of stages C2 to Cn. They are therefore angularly offset relative to the couplers of the stages C2 to Cn by half the angular pitch $\frac{1}{2}\alpha$.

Since the $\frac{1}{2}N$ fibers of each set of fibers are wound helically with the same pitch, the length of each fiber between the inlet and the outlet of the diffuser is the same, and each fiber follows an identical path. Thus, on observing the development on a plane of the diffuser as shown in FIGS. 2 and 3, the paths of each set of fibers are constituted by mutually parallel straight lines. Since both sets have the same helical pitch, all N fibers of the diffuser have the same length between the inlet and the outlet of the diffuser, and the paths of the fibers in both sets are identical since, in the development of the diffuser as shown in FIGS. 2 and 3, each path is constituted by a straight line interconnecting one inlet and one outlet, with each straight line being at the same angle of inclination relative to the generator lines of the cylinder, which in these figures are constituted by straight lines parallel to AA' and BB'.

These geometrical properties of the diffuser of the invention make it possible to automate the winding and coupling (striping lengths of fiber, twisting them together in pairs, and applying heat treatment to the twisted lengths), thereby enabling identical diffusers to be produced on a continuous basis using long fibers. In particular, it will be observed that after the n-th stage Cn, the fibers may continue to be wound with the couplers of stages C1 to Cn of another diffuser then being made. Successive diffusers are separated, between the outlets of one diffuser and the inlets of the following diffuser, e.g. by being cut apart.

Figure 4:
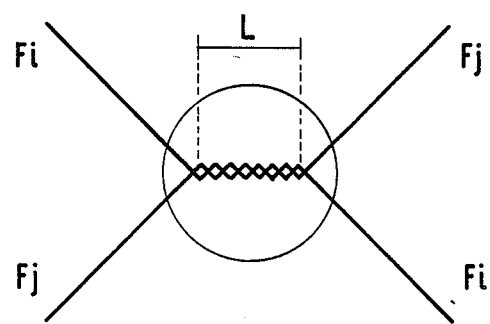
FIG. 4 is a symbolic representation of a coupler in a diffuser of the invention.

FIG. 4 is a symbolic representation of an elementary coupler in the diffuser, constituted, for example, by twisting together two fibers Fi and Fj over a length L, with the fibers being prepared by being stripped where they are to be twisted together, and with the twisted portion subsequently being subjected to heat treatment. This particular way of making an elementary 2-by-2 type coupler by twisting is given merely by way of example, since the couplers can also be made by polishing or by stretching or by any other means known to the person skilled in the art.

Figure 6:
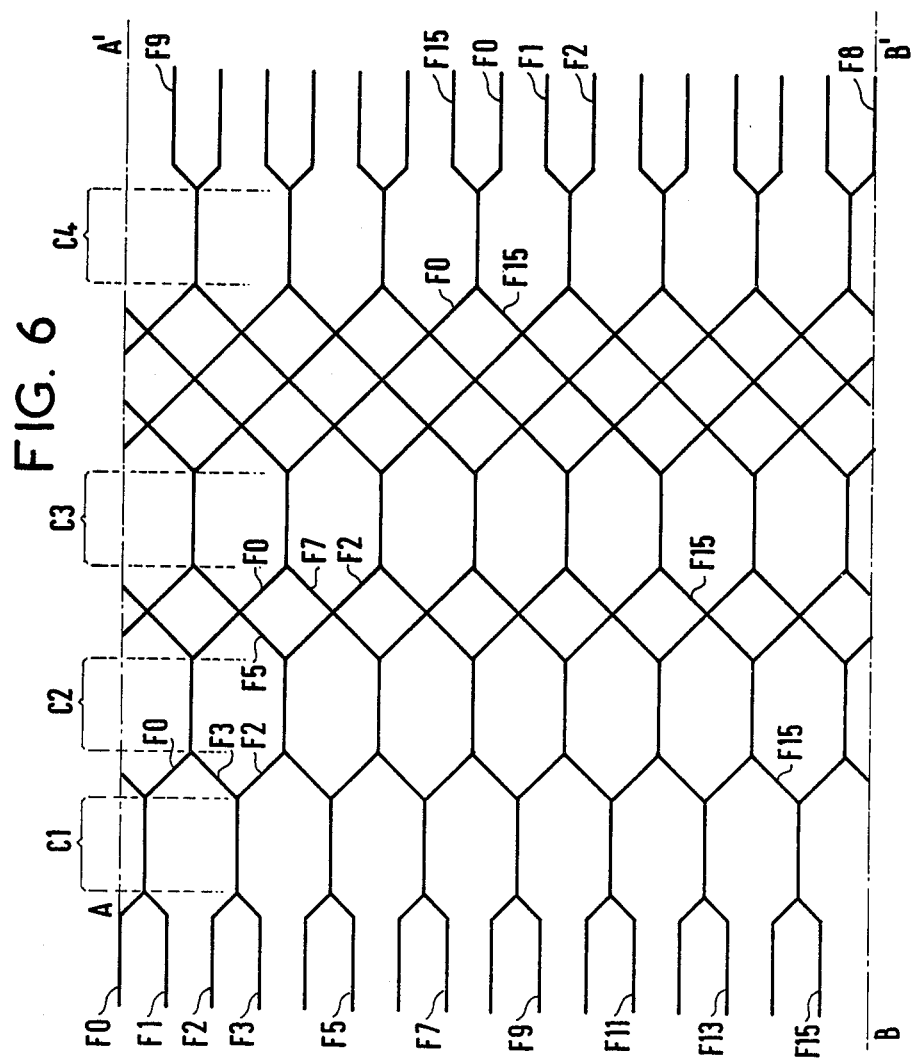

FIGS. 5 and 6 are both developments on a plane showing, respectively, a cylindrical mandrel and a diffuser made on said mandrel, and a 16 by 16 diffuser made on said mandrel.

For a 16 by 16 diffuser, i.e. $N=16=2^4$, the mandrel comprises $2N=32$ longitudinal grooves R0 to R31, 8 righthand helical grooves RD1 to RD8, and 8 lefthand helical grooves RL1 to RL8. At the inlet to the diffuser, the fibers are received over a certain length of every other longitudinal groove R0 to R31, until they encounter a helical groove in which they are then received. As soon as two fibers cross each other, they are associated to form one of the couplers of stage C1: fibers F0 to F1 form one coupler; fibers F2 and F3 form another coupler of the stage C1; and fibers F14 and F15 form another coupler. Each coupler is received in the longitudinal groove which passes through the point where the two fibers meet, and its length is equal to the diagonal of one mesh constituted by the righthand and lefthand helical grooves. On leaving a coupler, each fiber is received in the helical groove whose winding direction corresponds to the winding direction of the fiber.

Each fiber of either set of fibers crosses over all $\frac{1}{2}N=8$ fibers of the other set, and as indicated above, couplers are made at cross-overs numbered $2^q$, with $q=0, 1, 2, \ldots, (1), (1)$, which gives cross-overs 1, 2, 4, and 8 with the fibers of the other set. Stage C1 corresponds to the first cross-overs stage C2 corresponds to the second cross-overs, stage C3 corresponds to the fourth cross-overs, and stage C4 corresponds to the eighth cross-overs.

Taking the fiber F0 by way of example, said fiber leaves its C1 stage coupler and subsequently crosses over a second helical groove, and it is coupled to the fiber received in said helical groove in order to constitute a coupler of the stage C2. On leaving its C2 stage coupler, the fiber F0 crosses over two more helical grooves and is coupled to the fiber received in the second one thereof which constitutes its fourth cross-over, thereby constituting a C3 stage coupler. On leaving its C3 stage coupler, the fiber F0 crosses over four helical grooves and is coupled to the fiber received in the fourth one thereof, i.e. its eighth cross-over, thereby constituting a C4 stage coupler. In this C4 stage coupler, the fiber F0 is coupled to the fiber F15 which is indeed the last fiber of the other set of fibers. It may be observed that at each intersection between two helical grooves, a pair of fibers may either merely cross over each other, or else they may enter a coupler, or else they may leave a coupler. Fiber cross-overs and therefore counted both at cross-overs between helical grooves and at cross-overs between said grooves at the inlets to couplers. However, intersections between helical grooves are not counted as constituting cross-overs at the outlets of couplers where the two fibers of the coupler diverge; and since the couplers of any one stage are disposed in a ring lying along the diagonals of the meshes formed by the helical grooves, there are no fibers at the outlet from a coupler other than the two fibers constituting said coupler. FIG. 6 is a developed view of a coupler made on the FIG. 5 cylindrical mandrel, without the longitudinal grooves and the helical grooves. FIG. 6 therefore only shows the paths of the 16 fibers of the diffuser. It can clearly be seen in this figure that each fiber retains its winding direction on leaving each coupler, but that it is offset by the length of a coupler (one mesh diagonal). At the outlet from the diffuser, the fibers are in the same order as they are at the inlet, but they are offset by one half turn round the cylinder.

In FIGS. 2 and 3 which are diagrammatical representations of a diffuser, the couplers are shown as being points, such that the fiber outlets are offset by one half of the helical pitch relative to the fiber inlets, and such that the length of the cylinder, i.e. of the diffuser, is a function of the helical pitch, but the offset between the inlets and the outlets is independent of the helical pitch.

In the embodiment shown in FIGS. 5 and 6, the same is true except insofar as the length of a diffuser is a function of the helical pitch and the total length of the diffuser is now equal to one half the helical pitch plus four times the length of a mesh diagonal since there are four stages of couplers in these figures. For an N by N diffuser, with $N=2^n$, there are n stages of couplers and the length of a diffuser is equal to one half the helical pitch plus n times the length of a mesh diagonal.

The length of the mesh diagonal, and thus the length of a coupler, depends on the helical pitch, and vice versa. In practice, the helical pitch is chosen as a function of coupler length.

By way of example, FIG. 7 shows a device for connecting a diffuser to an inlet cable head and to an outlet cable head. The inlet cable head is constituted by a cylindrical ring 52 and a truncated cone 54 situated at the end of an optical fiber cable 56. The outlet cable head is constituted by a cylindrical ring 53 and a truncated cone 55 situated at the end of an optical fiber cable 57. The cylindrical rings 52 and 53 are obtained by cutting off the ends of the mandrel 51 which supports the diffuser of the invention, such that these rings have longitudinal grooves at the same pitch as said mandrel 51. In this figure, the longitudinal grooves and the helical grooves of the mandrel 51 and of the rings 52 and 56 are not shown for the sake of clarity. These grooves are shown in FIG. 5. Each of the cables 56 and 57 has N fibers, and these fibers are distributed over the corresponding truncated cone 54 or 55 and then inserted into the longitudinal grooves of the ring 52 or 53 associated with the truncated cone. Since the N by N diffuser has been made on the mandrel 51, optical continuity is obtained between the fibers of the diffuser and the fibers in the cables 56 and 57 either by juxtaposing the cylindrical faces of the mandrel and of the rings, with said faces being polished after the fibers have been mounted in the grooves, and with the rings and the mandrel including positioning means for aligning the ends of the fibers in the mandrel and the rings, or else by welding together the fibers to be interconnected after the mandrel and the rings have been juxtaposed.

The diffuser of the invention may be made using monomode or multimode optical fibers, or by using plastic fibers, and thus more generally, by using any kind of light duct suitable for making couplers.

The term "light duct" is equally applicable to integrated optics obtained either by depositing optically conductive material in the longitudinal and helical grooves of a cylindrical mandrel as shown in FIGS. 5 and 6, in which case the fibers are replaced by said material, or else by depositing optical conductive material on the surface of the mandrel in a pattern giving rise to the diffuser paths shown in FIG. 6, with the mandrel serving as a substrate.

The diffuser of the invention is applicable to large capacity telecommunication devices, for example such as the device described in French Pat. No. 2 586 874 in which the interconnection volume may be provided by a diffuser of the invention, or else the device described in French Pat. No. 2 593 654 in which the passive optical distributor may likewise be constituted by a diffuser of the invention.

We claim:

1. An N by N type optical diffuser where $N=2^n$, having n stages each comprising $\frac{1}{2}N$ couplers each providing coupling between two light ducts, said diffuser being made from N light ducts whose ends constitute the inlets and the outlets of the diffuser, wherein the light ducts constitute two sets of $\frac{1}{2}N$ light ducts each, with each set being constituted by every other light duct, said sets being wound helically on a cylinder in opposite directions and at the same pitch, with each light duct of either assembly crossing over the $\frac{1}{2}N$ light ducts of the other assembly, and with each light duct of either assembly being coupled to n of the light ducts of the other assembly at those cross-overs of said light duct with the $\frac{1}{2}N$ light ducts of said other assembly having cross-over numbers $2^q$, where $q=0, 1, 2, \ldots,$.

2. An optical diffuser according to claim 1, wherein the two sets of light ducts constitute a lattice and the couplers are disposed along respective mesh diagonals of the lattice parallel to a generator line of the cylinder.

3. An optical diffuser according to claim 1, wherein the eneds of a light duct constituting an inlet and an outlet of the diffuser are offset from each other by one half of the helical pitch, and the outlets succeed one another in the same order as the inlets.

4. An optical diffuser according to claim 1, wherein the cylinder includes longitudinal grooves and helical grooves, with the ends of each light duct being disposed in the longitudinal grooves, with the couplers being disposed in the longitudinal grooves, and with the light ducts being disposed in the helical grooves between the inlets and a first stage of couplers, between each successive pair of coupler stages, and between a last stage of couplers and the outlets of the diffuser.

5. A diffuser according to claim 4, connected at one end to an inlet cable via an inlet cable head and at its other end to an outlet cable via an outlet cable head, with each of said cable heads being constituted by a cylindrical ring and a truncated cone, with each cylindrical ring being obtained by cutting up the cylinder of the diffuser and including at least the longitudinal grooves, and with each inlet and outlet cable including N light ducts distributed over a respective truncated cone, with the N light ducts having ends disposed in the longitudinal grooves of the ring associated with the truncated cone, the longitudinal grooves of the rings and the longitudinal grooves of the diffuser cylinder being in alignment.

* * * * *